United States Patent [19]

de Rham

[11] 4,091,118

[45] May 23, 1978

[54] PROCESS FOR THE PRODUCTION OF A VEGETABLE-BASED SWEETENED CONDENSED MILK

[75] Inventor: Olivier de Rham, Vevey, Switzerland

[73] Assignee: Societe d'Assistance Technique Pour Produits Nestle S.A., Lausanne, Switzerland

[21] Appl. No.: 738,878

[22] Filed: Nov. 4, 1976

[30] Foreign Application Priority Data

Sep. 28, 1976 Switzerland .................. 12244/76

[51] Int. Cl.² .................. A23C 11/00; A23L 1/20
[52] U.S. Cl. .................. 426/46; 426/587; 426/658
[58] Field of Search .................. 426/44, 46, 51, 56, 426/60, 587, 601, 602, 613, 656, 658

[56] References Cited

U.S. PATENT DOCUMENTS

| Re. 28,810 | 5/1976 | Tsumura et al. | 426/46 |
|---|---|---|---|
| 1,175,467 | 3/1916 | Melhuish | 426/46 X |
| 3,220,851 | 11/1965 | Rambaud | 426/46 |
| 3,585,047 | 6/1971 | Fujimaki et al. | 426/46 |
| 3,830,942 | 8/1974 | Hawley | 426/46 X |
| 3,846,560 | 11/1974 | Hempenius et al. | 426/44 X |
| 3,941,890 | 3/1976 | Drachenberg et al. | 426/46 |

FOREIGN PATENT DOCUMENTS 1,383,149  2/1975  United Kingdom .................. 426/44

OTHER PUBLICATIONS

L. M. Lampert, "Modern Dairy Products", Chemical Publ. Co., N. Y., 1965, pp. 241–242.

Primary Examiner—Robert A. Yoncoskie
Attorney, Agent, or Firm—Watson, Leavenworth, Kelton & Taggart

[57] ABSTRACT

A process is provided for the production of a vegetable-based sweetened condensed milk in which a vegetable protein in the form of an aqueous solution or suspension is subjected to partial enzymatic hydrolysis and a mixture containing approximately 4 to 9 parts by weight of fats, 8 to 18 parts by weight of the treated protein, 0 to 14 parts by weight of lactose, 40 to 55 parts by weight of sucrose and 25 to 32 parts by weight of water is prepared. The proteins in suspension are subjected to a partial precipitation and the precipitated fraction is eliminated after the enzymatic hydrolysis step. A basic salt may be added to the mixture which may or may not have been subjected to the partial precipitation step. Partial precipitation is preferably brought about by addition of a calcium salt in a concentration of up to 0.001 to 0.1 M or by adjustment of the pH of the hydrolysed suspension to a value of from 4.5 to 7.

7 Claims, No Drawings

PROCESS FOR THE PRODUCTION OF A VEGETABLE-BASED SWEETENED CONDENSED MILK

The application of Jan Kruseman, Pierre Yves Bertschy and Jaime Hidalgo, Ser. No. 738,877 filed concurrently herewith, the teachings of which are hereby incorporated by reference describes a process for the production of a vegetable-based sweetened condensed milk, which comprises subjecting a vegetable protein in the form of an aqueous solution or suspension to partial enzymatic hydrolysis and preparing a mixture containing approximately 4 to 9 parts by weight of fats, 8 to 18 parts by weight of the treated protein, 0 to 14 parts by weight of lactose, 40 to 55 parts by weight of sucrose and 25 to 32 parts by weight of water.

Now, it has been found that, by using certain enzymes different from those mentioned in the application cited above and, in particular, when it is absolutely essential to inactivate the enzyme by heat treatment, the product obtained may have an excessively high viscosity and sometimes a bitter taste.

The present invention is the outcome of the search for a remedy to this phenomenon.

Thus, the present invention provides a process for the production of a vegetable-based sweetened condensed milk which comprises subjecting a vegetable protein in the form of an aqueous solution or suspension to partial enzymatic hydrolysis and preparing a mixture containing approximately 4 to 9 parts by weight of fats, 8 to 18 parts by weight of said treated protein, 0 to 14 parts by weight of lactose, 40 to 55 parts by weight of sucrose and 25 to 32 parts by weight of water, said proteins in suspension being subjected to partial precipitation and said precipitated fraction being eliminated after said enzymatic hydrolysis step.

In order to obtain this partial precipitation, it is possible either to add a calcium salt, such as $CaCl_2$ for example, to the suspension before or after hydrolysis in a concentration of from 0.001 to 0.1 M, or to reduce the pH-value of the hydrolysate to a value of from 4.5 to 7, preferably from 5.5 to 6, or even to combine these two techniques. The precipitated proteins may be eliminated by filtration or centrifuging for example. In order to eliminate the possible bitterness mentioned above, attributable to the peptides of low molecular weight, the product obtained after hydrolysis may be subjected, for example, to ultrafiltration following removal of the precipitated proteins.

Finally, it has been found that the stability in hot coffee of the vegetable-based sweetened condensed milk according to the invention and according to the application of Kruseman et al referred to above may be increased by adding a basic salt to the mixture. It is preferred to add sodium or potassium bicarbonate in a quantity of 0.1 to 1% by weight, or sodium or potassium carbonate in a quantity of from 0.05 to 1% be weight. It is also possible to use other basic salts, such as $Na_2HPO_4$, for example.

In addition, although the fundamental object of the process according to the invention is to produce a purely vegetable sweetened condensed milk, it is also possible to replace at least some of the ingredients entering into its composition by milk powder.

The invention is illustrated by the following Examples, in which the parts and percentages quoted are by weight.

EXAMPLE 1

10 kg of commercial soya isolate (Promine R, a product of the Central Soya Corporation of the United States of America) are dispersed in 90 kg of water while adding 135 g of $CaCl_2 \cdot 2H_2O$. The pH is adjusted to 7 with NaOH. After heating 60° C, 200 g of pancreatin (produced by Fluka AG, Switzerland) are added while stirring. The enzyme is left to incubate for 5 hours during which the pH-value is kept at 7 and the temperature at 60° C. The enzyme is inactivated by heating for 10 minutes to boiling temperature and is then cooled to 20° C. After centrifuging, 79 kg of supernatant phase are collected.

36.5 kg of sucrose, 11.1 kg of lactose, 5.9 kg of melted soya fat and the 79 kg of hydrolysate obtained avove are mixed at 40° C. The mixture is thoroughly mixed. It is then pasteurised for 1 minute at 80° C in a scraped-surface heat exchanger. It is then concentrated by evaporation in vacuo until its dry matter content reaches 72%. It is then cooled and seeded with lactose. 85 kg of sweetened condensed milk with a viscosity of 7200 cP are obtained.

EXAMPLE 2

A hydrolysate is prepared in the same way as described in Example 1, except that the calcium salt is not added. After the enzyme has been inactivated, 25 kg of the suspension are removed. Its pH is lowered to 5.5 with HCL. The suspension is then centrifuged in an Alpha Laval S plate centrifuge and 20 kg of supernatant phase are collected.

1.9 kg of lactose, 6.5 kg of sucrose, 1.06 kg of hydrogenated soya fat and the 20 kg of supernatant phase, of which the pH is adjusted to 7 with NaOH, are mixed at 40° C. The mixture is pasteurised and concentrated in the same way as described in Example 1. It is introduced into cans and sterilised by immersing the cans for 30 minutes in water heated to 80° C. A sweetened condensed milk with a viscosity of 22,000 cP is obtained.

EXAMPLE 3

A hydrolysate is prepared from 1.5 kg of soya isolate (Promine R) in the same way and using the same proportions as described in Example 1. After centrifuging, the supernatant phase is diluted to give 25 kg of dilute hydrolysate. The dilute hydrolysate is then filtered in a Seitz filter press equipped with Koth 7 filters. 20 kg of dilute, filtered hydrolysate are collected and subjected to ultrafiltration in a DDS (De Danske Sukkerfabrikker) pilot module equipped with DDS 800 membranes. 15 kg of permeate are thus eliminated. The concentrate is washed while adding 5 kg of distilled water and continuing the ultrafiltration treatment. Another 5 kg of permeate are eliminated. 6.3 kg of purified protein suspension are collected.

133 g of lactose, 430 g of sucrose, 70 g of hydrogenated soya fat, 607 g of water and 760 g of the above protein suspension are mixed at 40° C. The mixture is concentrated by evaporation in vacuo and then heated to 80° C, followed by cooling. 1 kg of sweetened condensed milk with a pleasant taste and a viscosity of 9200 cP is obtained

EXAMPLE 4

A sweetened condensed milk is prepared in the same way as described in Example 3 except that 0.5% of $NaHCO_3$ is added to the mixture. The product obtained shows no trace of precipitation when used for sweetening and whitening coffee at 80° C.

EXAMPLE 5

A sweetened condensed milk is prepared in the same way as described in Example 3 except that, in the recipe of the mixture, 230 g of the suspension of vegetable proteins and 40 g of lactose are replaced by 70 g of skimmed milk powder dispersed in 200 g of water. The product obtained has a greater whitening power than the sweetened condensed milk of Example 3.

I claim:

1. A process for the production of a vegetable-based sweetened condensed milk which comprises subjecting a vegetable protein in the form of an aqueous solution or suspension to enzymatic hydrolysis to enzymatically digest a portion of said protein, said enzymatically hydrolysed proteins in suspension or solution being subjected to partial precipitation to separate undigested protein from digested protein and said undigested protein being eliminated after the enzymatic hydrolysis step, and thereafter preparing a mixture containing approximately 4 to 9 parts by weight of fats, 8 to 18 parts by weight of said digested protein, 0 to 14 parts by weight of lactose, 40 to 55 parts by weight of sucrose and 25 to 32 parts by weight of water.

2. A process according to claim 1, in which to obtain partial precipitation, a calcium salt is added to said suspension in a concentration of up to 0.001 to 0.1 M.

3. A process according to claim 1, in which to obtain partial precipitation, the pH-valve of said hydrolysed suspension is lowered to a value of from 4.5 to 7 after the completion of hydrolysis.

4. A process according to claim 3, in which said pH-value is lowered to a value of from pH 5.5 to pH 6.

5. A process according to claim 1, in which a basic salt is added to said mixture in an effective amount to increase the stability of said mixture in hot coffee.

6. A process according to claim 5, in which said basic salt is added in a quantity of from 0.05 to 1 % by weight.

7. A process according to claim 6, in which said basic salt is sodium or potassium carbonate or bicarbonate.

* * * * *